United States Patent [19]

Woodhams

[11] 4,442,243

[45] Apr. 10, 1984

[54] REINFORCED RESIN COMPOSITES

[76] Inventor: Raymond T. Woodhams, 33 Palisades, Toronto, Ontario, M6S 2W9, Canada

[21] Appl. No.: 388,996

[22] Filed: Jun. 16, 1982

[51] Int. Cl.$^3$ .............................................. C08K 3/34
[52] U.S. Cl. .................................. 523/212; 524/275; 524/487; 524/449
[58] Field of Search .............. 524/487, 489, 488, 490, 524/427, 449, 451, 452, 456, 275, 487; 523/212; 525/386

[56] References Cited

U.S. PATENT DOCUMENTS

| | | | |
|---|---|---|---|
| 3,243,395 | 3/1966 | Guillet et al. | 524/485 |
| 3,271,340 | 9/1966 | Shearer et al. | 524/489 |
| 3,580,882 | 5/1971 | Nielsen et al. | 524/449 |
| 3,775,359 | 11/1973 | Georgiana et al. | 524/489 |
| 4,040,997 | 8/1977 | Van Vonno et al. | 524/489 |
| 4,165,302 | 8/1979 | Armenti et al. | 524/449 |
| 4,317,765 | 3/1982 | Gaylord | 523/204 |

FOREIGN PATENT DOCUMENTS

| | | | |
|---|---|---|---|
| 53-65346 | 6/1978 | Japan | 524/427 |

OTHER PUBLICATIONS

SPE Journal, vol. 16, No. 3, Mar. 1960, J. E. Guillet & H. W. Coover, Jr.
"Epolene E-43 Emulsifiable Wax", Pamphlet issued by Eastman Industrial Chemicals.
"Modern Plastics", Oct. 1979, p. 41.
"Composites", Sep. 1974, p. 193, Mica Reinforced Plastics: A Review, F. W. Maine & P. D. Shephard.
Polymer Engineering and Science, vol. 18, No. 11, Aug. 1978, Han et al., pp. 849-854.
34th Annual Technical Conference (1979), Reinforced Plastics Composite Inst., The Soc. of Plastics Ind. Inc., Sec. 24E, p. 1.
"Polymer Composite", Sep. 1980, vol. 1, No. 1, p. 37, S. Newman & F. J. Meyer.

*Primary Examiner*—Lewis T. Jacobs
*Attorney, Agent, or Firm*—Murray & Whisenhunt

[57] ABSTRACT

Mica reinforced thermoplastic composites, especially polypropylene composites, are prepared by a hot melt mixing process in which the mix contains propylene polymer waxes, in an amount up to about 10 percent by weight based upon the mica. The propylene polymer wax may be degraded, hydrocarbon isotactic polypropylene, or derivatized polypropylene wax such as maleated or sulfonated polypropylene wax. The wax has the effect of increasing the tensile strength and durability of the composite, and providing a smooth, uniform and glossy surface finish.

20 Claims, No Drawings

REINFORCED RESIN COMPOSITES

This invention relates to thermoplastic composites reinforced with finely divided inorganic fillers, and methods for their preparation. More specifically, it relates to such reinforced thermoplastic composites which have improved strength and moulding characteristics, and improved methods of preparing same.

It is known to prepare composites which consist essentially of thermosetting or thermoplastic resinous matrix materials having dispersed therein inorganic reinforcing fillers, such as mica platelets or flakes. Such materials are described, for example, in U.S. Pat. No. 3,764,456 Woodhams issued Oct. 9, 1973, in U.S. Pat. No. 4,082,880 Zboril issued Apr. 4, 1978, and in U.S. Pat. No. 4,112,036 Woodhams et al, issued Sept. 5, 1978. Such composites have been reported to have sufficiently high strength, modulus and durability to constitute construction materials and moulded parts for use, e.g. in automobiles in replacement of steel, with the consequent savings in weight and cost.

U.S. Pat. No. 3,764,456 teaches that, in respect of mica reinforced composites, mica of aspect ratio (namely ratio of average diameter to average thickness) at least 30 should be used in order to obtain composites of good physical properties. Also according to this patent the high aspect ratio (HAR) mica should be incorporated into the resin matrix in such a manner that the mica platelets become aligned therein in a plane, and are firmly bonded to the resin at their surfaces.

U.S. Pat. No. 4,112,036 describes high aspect ratio mica platelets dispersed in thermosetting unsaturated polyester resins to form moulding composites. These composites are prepared by mixing dry powdered resin with the mica flakes to form resin coated mica platelets, heating the mixture so formed and then shaping and cooling the hot, partially coalesced material to form moulding compounds.

It has now been found that resin composites reinforced with inorganic fillers and having improved durability, physical and aesthetic properties can be prepared by a process in which the mixing of the resin and the inorganic reinforcing filler takes place with the resin in liquid phase and in the presence of propylene polymer wax. Not only are the physical properties (tensile strength and modulus) and durability of the composites of the present invention improved, but also the composites can be re-ground and re-moulded to give moulded materials exhibiting little if any deterioration in physical properties. Further, the surface finish of moulded parts from composites of the present invention is smooth, uniform and glossy, instead of the dull mottled appearance normally obtained with composites of this type.

Since the invention has been primarily developed, and shows its most useful application, with polypropylene matrix materials reinforced with mica, it will be more specifically described below in detail in connection with polypropylene-mica composites. However, the invention is not limited to such materials. It shows advantages when used in conjunction with preparation of composites of other polyolefin resins, for example polyethylene, polystyrene, ethylene-propylene copolymers, styrene copolymers and the like, and when used in conjunction with preparation of composites reinforced with other types of inorganic fillers, for example calcium carbonate, silica (in its various forms), glass fibres, graphite, talc, asbestos, wollastonite, etc.

The propylene polymer waxes which are used in the present invention may be homopolymeric isotactic polypropylene of relatively low molecular weight, or copolymers of propylene with one or more other monomers, for example, ethylene, butene, pentene, and other $\alpha$-olefins. In the case of copolymeric propylene waxes, the propylene content thereof should be at least 50 mole per cent. The molecular weight of the propylene wax (number average) is suitably from about 500 to about 10,000. The choice of suitable wax should be made in conjunction with the chosen matrix resin, to ensure suitable compatibility. Polypropylene waxes are known in the art, and may be prepared by the thermal degradation of high molecular weight polypropylene, e.g. following the procedure described in U.S. Pat. No. 2,835,659 Guillet. Useful such polypropylene waxes and processes for their preparation are also disclosed in "SPE Journal", Volume 16, No. 3, March 1960, in an article entitled "Polypropylene Wax - A New Resin for Plastic and Coating Applications", by J. E. Guillet and H. W. Coover. Polypropylene waxes so formed are hydrocarbon in nature, but have unsaturation at or near their chain termination, so that they can be regarded as "functionalized" hydrocarbon polymers, owing to the presence of the functional unsaturation. In the present invention the polypropylene waxes may be used as such. Alternatively they may be further derivatized by reaction with suitable reagents which will react with their chemical unsaturation to put other functional groups thereon. Thus they may be reacted with unsaturated organic acid anhydrides such as maleic anhydride, succinic anhydride or the like, to put on carboxyl functions, or with acetyl sulfate to form a sulfonated functional derivative. It is an advantage in the present invention, when using the hydrocarbon wax, to use a polypropylene wax which has the same tacticity as the polypropylene matrix material used as the major portion of the composite. For example, most commonly isotactic polypropylene is used as the matrix material along with polypropylene. Thermal degradation of high molecular weight polypropylene leads to the formation of polypropylene waxes of the same tacticity as the high molecular weight polypropylene starting material.

An example of a commercially available derivatized polypropylene wax which is suitable for use in the present invention is that sold under the trade mark EPOLENE E-43 by Eastman Chemical Products Inc.

In a further embodiment of the present invention, the mica for use in the composites may be pretreated with chemical reagents which have the effect of providing functional groups on the mica for subsequent chemical reaction with or affinity for propylene polymer wax. It is preferred to treat the mica in this regard to put amino functionality thereon, e.g. by treatment with amino silane. Such surface treatment of mica has been previously proposed and used. Examples of suitable amino silane treating reagents are $\gamma$-aminopropyltriethoxysilane (Union Carbide A-1100) and N-(3-trimethoxysilylpropyl)-N'-(p-vinylbenzyl) ethylenediaminemonohydrochloride (Dow Corning Z-6032) Preferably the amount of silane treating agent used should be from about 4:1 to 1:1 molar, based on the amount of propylene polymer wax.

Whilst it is not intended that the present invention should be limited to any particular theory of action or mechanism, it is believed that the propylene polymer waxes used in the present invention act as either or both wetting agents and chemical coupling agents for the inorganic reinforcing particles, e.g. mica platelets, in the matrix. As the size of the inorganic particles for use in the composites decreases, the task of dispersing the particles in the polypropylene resin becomes increasingly difficult. The propylene polymer wax is believed to provide a low viscosity liquid medium to surround and wet the individual particles, as the composite is prepared using molten, liquid high molecular weight polypropylene as the matrix material. Accordingly, the resultant composites have increased affinity or adhesion between the reinforcement such as mica and the polypropylene matrix. This wetting action may be supplemented by chemical reaction of the propylene polmer wax end with the particle surface, utilizing its derivatized functional groups, e.g. maleates etc., or in the case of non-derivatized wax its unsaturation. The remainder of the wax polymer chain is compatible with the polypropylene matrix, so as to form a relatively strong bond between the polypropylene of the matrix and the inorganic reinforcing particles.

In the method of preparation of the composites according to the present invention, the inorganic particles e.g. mica flakes, propylene polymer wax and polypropylene matrix material may be simply mixed together using standard mixing apparatus (Banbury mixer, Brabender, Gelimat, two-roll mill, etc.) under elevated temperature conditions so that the polypropylene is in its molten condition. The condition of temperature, agitation, time etc., should be chosen so as to ensure production of intimate, uniform dispersion, without causing thermal or mechanical degradation of the polypropylene to any significant extent. Conditions of high shear agitation are preferred. The mixture should also contain appropriate antioxidants and metal scavenging compounds, to enhance its stability.

An alternative method of preparation involves the pretreatment of the mica flakes with an emulsion of the derivatized propylene polymer wax. These waxes can be emulsified by neutralising with a base, preferably ammonia, and then heating the neutralized wax with water in a sealed pressure reactor to a temperature above the melting point of the wax (i.e. above about 160° C. and preferably above 200° C.). The aqueous emulsion of wax is recovered on cooling. It can then be used to treat the mica flakes, in the appropriate amounts, ready for subsequent mixing of the treated mica and the polypropylene matrix resin under molten resin conditions. This process has the additional advantage, that the mica after treatment with wax emulsion, is much denser and hence more controllable on storage, less prone to dispersion in wind currents and drafts.

Mica, as is known, is a naturally occurring mineral material which contains many metallic elements such as potassium, magnesium, aluminum and iron. The precise nature and composition of mica differs according to its source. Many types of micas can be readily distinguished by their colour, the most common varieties being muscovite mica (usually colorless) and phlogopite mica (dark brown). However, within each class there may be subtle material differences with respect to ease of cleavage, toughness of the individual flakes, ease of wetting by resins, moisture retention and electrical properties which may distinguish one type of mica from another. The present invention contemplates the use of any and all types of naturally occurring mica, with the exception of biotite varieties. The benefits of the invention can be obtained with any of the various currently available micas. To prepare them for use in the present invention, it is preferred to grind and classify the samples of mica to obtain fractions having well defined particle dimensions and aspect ratios. Wet grinding of mica is preferred for producing thin, high quality flakes. It is a very significant advantage of the present invention, that cheaper, coarser grades of mica can be used as the reinforcement, rather than expensive, finely ground or chemically treated mica, ano similar or improved physical properties obtained in the composite. Whilst it is preferred to have high aspect ratio (at least 30) mica dispersed in the matrix material of the finished composite, for best results, it is not necessary to prepare and add such high aspect ratio mica initially. Cheaper, coarser varieties may be used and very useful composites, of improved strength properties, still obtained.

The proportion of inorganic reinforcing materials e.g. mica platelets to be used in the present invention is suitably such as to give a composite having a mica volume fraction from 20 to about 80 volume per cent, and most preferably from about 30 to about 60 volume per cent. Strength and modulus of the composites appear to increase with mica volume fraction up to about 60 volume per cent. From an economic point of view, it is desirable to have as high a content of mica in the composite as consistent with desirable strength and other physical properties.

The amount of propylene polymer wax for use in the present invention can vary over wide limits, and the preferred amounts are often determined by economic considerations. Unmodified, underivatized polypropylene waxes are relatively cheap materials, and are preferred for this reason. From about 1% to about 10% by weight of such polypropylene wax based upon mica in the composite appears to be suitable. In the case of derivatized propylene polymer wax, amounts from about 1-5% by weight are preferred.

The invention is further illustrated in the following specific examples. In each case in the examples, the thermoplastic polyolefin resin used was isotactic homopolymeric polypropylene namely PRO-FAX 6523 PM (powder form for general purpose) obtained from Hercules Canada Limited. The m:ca was phlogopite type, namely SUZORITE 60S and 200HK obtained from Marietta Resources International Limited.

Example 1—Preparation of Polypropylene Wax 250 g of isotactic polypropylene was heated for 30 minutes at 320° C. in a 500 ml reaction kettle equipped with a stirrer and a temperature control. The melt viscosity of the thermally degraded polymer thus formed was then measured with a Brookfield Syncro Lectric Viscometer and found to be about 500 cp at 190° C. Its melting point was 157°-160° C. This degraded polypropylene was derivatized by reaction with maleic anhydride, 200 g of the degraded polymer and 10 g of maleic anhydride being placed in a 500 ml reaction kettle equipped with stirrer, dropping funnel and steam-jacket condensor. The reaction mixture was heated to 200° C. and di-t-butyl peroxide (0.51 g) dissolved in 15 ml heptane was added dropwise from the dropping funnel to the reaction mixture over a period of thirty minutes with constant stirring. This reaction mixture was stirred at 200° C. until the reaction was complete. The melt viscosity of the resulting product was about 700 cp at 190° C. with a melting point of 157°-159° C. The maleated polypropylene wax thus formed was then powdered with a high speed pulverizer and sifted with a 48 mesh sieve.

Example 2—Surface Treatment of the Mica

To prepare some samples for testing in accordance with the present invention, mica was treated with two types of silane coupling agents. The first was gamma-aminopropyltriethoxysilane (Union Carbide A-1100) and the second was styrylamine-functional silane (Dow Corning Z-6032). In order to effect the surface treatment, a methanol solution (300 mL methanol per 200 grams mica) with a silane loading of 0.5 percent by weight of the mica was prepared. The pH of the mixture was adjusted to 3-3.5 by addition of acetic acid to facilitate silane hydrolysis. After the solution was well mixed, it was added to mica in a beaker. Then the resulting mica slurry was stirred for three to four hours in a fume hood, and subseguently spread onto an aluminum tray. The methanol and acetic acid were evaporated in the fume hood. The mica was dried in an oven at 60° C. overnight.

Example 3—Preparation of Injection Moulded Specimens

Mica, polypropylene and maleated polypropylene wax were all placed in a plastic container and blended for at least 30 minutes using a portable roller mill. The mixture was compounded in a Brabender twin-screw extruder which consisted of two counter-rotating intermeshing 42 mm screws. The rotational speed of the screws was set at 5 rpm, and the barrel temperature was controlled at 210° C., 215° C. and 220° C. for zones 1, 2 and 3 respectively. The extrudate was cooled to room temperature and then pelletized in a Brabender granulator.

Test specimens were injection moulded with a Hillard plunger-type injection moulding machine, using a barrel temperature of 215° C., a mould temperature of 50° C., a residence time of 30 minutes, an injection time of 5 seconds, and a cooling time of 30 seconds. In the various samples, a variety of mica contents, from 0-50 weight percent, was used.

Tensile tests were performed in accordance with ASTM Standard D 638-77a on an Instron tester with a constant crosshead speed of 0.5 cm per minute. Usually, more than 10 specimens were tested to give more statistical data. Tensile moduli were measured with a 25 mm strain gauge extensometer.

The following examples show the results of such tests on the samples prepared in various ways, with different loadings of mica, as set out in the examples themselves and in the tables of results.

The samples were also subjected to Izod Impact tests on sharp notched specimens. Impact strength is the energy absorbed by the specimen during the test, the injection-moulded impact test specimens were notched and tested with a pendulum type Tinius Olsen Model 66 Plastic Impact Tester in accordance with ASTM Standard D 256-73.

Example 4

According to the procedures described in the previous examples, mica-reinforced polypropylene composites according to the present invention were prepared, consisting of 250 parts by weight polypropylene resin and 100 parts by weight Suzorite mica 200 HK. In the control sample, no propylene polymer wax was used. In sample A, 2.33 parts by weight of the maleated polypropylene wax prepared in Example 1 was added. In each case, the mica was pre-treated with silane Z-6032, as in Example 2. The samples were then tested for tensile flexural properties and Izod impact strength. The results were given below in Table I.

TABLE I

|  | Control | Sample A |
|---|---|---|
| Tensile strength (MPa) | 30.5 | 36.7 |
| Tensile modulus (GPa) | 6.5 | 6.0 |
| Flexural strength (MPa) | 61.9 | 73.4 |
| Flexural modulus (GPa) | 7.3 | 7.5 |
| Izod impact strength (kJ/m$^2$) | 3.7 | 4.0 |

Example 5

The effect of maleated polypropylene wax on tensile properties of mica-polypropylene composites was tested wherein the composites were comprised of variable amounts of mica from 0 to 50 parts, in a 100 parts of polypropylene and 2.33 parts of maleated polypropylene wax as described in Example 1. The results are shown in Table II

TABLE II

| MICA WT % | TENSILE STRENGTH (MPa) | TENSILE MODULUS (GPa) |
|---|---|---|
| 0 | 31.5 | 1.7 |
| 10 | 32.3 | 2.8 |
| 20 | 33.1 | 4.2 |
| 30 | 34.9 | 5.8 |
| 40 | 35.3 | 7.7 |
| 50 | 36.5 | 9.2 |

It may be seen from these results that there is a significant increase in tensile modulus and tensile strength as the amount of mica is increased in the mica-polypropylene composites containing maleated polypropylene.

Example 6

The effect of maleated polypropylene wax (2.33 parts by weight) on the tensile properties of mica-polypropylene composites containing variable amounts of aminosilane-treated mica prepared as in Example 2 using A-1100 silane were investigated. The results are shown in Table III.

TABLE III

| MICA WT. % | TENSILE STRENGTH (MPa) | TENSILE MODULUS (GPa) |
|---|---|---|
| 0 | 31.5 | 2.5 |
| 10 | 33.7 | 3.0 |
| 20 | 35.5 | 4.2 |
| 30 | 37.7 | 5.1 |
| 40 | 38.2 | 7.2 |
| 50 | 41.8 | 10.0 |

When further compared to samples using chlorinated paraffins as processing aids mica-polypropylene composites containing aminosilane treated mica and polypropylene waxes proved to be far superior, which would not cause any corrosion problems in the processing machinery as in the case of composites containing chlorinated parrafins.

Example 7

The effects of A-1100 silane treatment of mica flakes, and addition of maleated polypropylene wax, on Izod impact resistance of mica-polypropylene composites containing variable amounts of mica were investigated using sharp notched specimens. The results are shown in Table IV.

TABLE IV

Notched Izod Impact Values kj/m²

| MICA WT % | MICA POLY-PROPYLENE COMPOSITE - NO TREATMENT OR ADDITIVES | MICA POLYPROPYLENE COMPOSITE CONTAINING MALEATED POLYPROPYLENE | MICA POLY-PROPYLENE COMPOSITE CONTAINING A-1100 SILANE TREATED MICA |
|---|---|---|---|
| 0 | 5.3 | — | — |
| 10 | 5.5 | 5.6 | 5.6 |
| 20 | 5.1 | 5.0 | 5.2 |
| 30 | 4.2 | 4.5 | 4.1 |
| 40 | 4.3 | 4.2 | 4.1 |
| 50 | 3.9 | 4.2 | 4.0 |

Although impact strength is the energy absorbed by the specimen during the test, in practice it is very difficult to obtain the energy required only to propagate a crack through the cross-sectional area of the specimen at the notched point. Thus, the results above represent energy lost by the pendulum during the breakage of the specimens which includes energies required (1) to initiate fracture of the specimen (2) to propagate the fracture, (3) to throw the broken parts, etc. and are mainly useful for comparison among different materials and the information on the impact behavioral trends with the changes of composition of the specimens.

The results indicate that Izod impact strength decreased with mica concentration, and silane treatments of mica or addition of maleated polypropylene affected Izod impact strength adversely. However, it may be concluded that considering the small impact strength decreases and the fairly large standard deviations, the treatments and additives did not affect Izod impact strength of the composite significantly.

The mica-polypropylene composites of examples 4 through 7, were tested for flexural properties and generally, it was found that the flexural behavior of the mica-polypropylene composites of this invention was not adversely changed from those of known mica reinforced plastic composites.

Example 8

Composites according to the invention and consisting of 40 parts by weight Suzorite mica 200 HK (no surface treatment) and 60 parts by weight polypropylene (Profax) were prepared under high shear mixing condition in standard mixing apparatus and samples prepared for measuring tensile strength, flexural modulus, flexural strength and Izod impact strength. A first sample composite (sample B) also contained 1 part by weight of Epolene E-43, a commercially available maleated polypropylene wax. A second, control sample contained no wax. The result of testing specimens from the two samples are given below.

| | Tensile Strength (MPa) | Flex. Modulus (GPa) | Flex. Strength (MPa) | Izod Impact (J/m) |
|---|---|---|---|---|
| Sample B | 34.0 | 6.9 | 81.0 | 21.1 |
| Control | 29.6 | 6.1 | 72.0 | 23.8 |

The flexural strength determined for Sample B is outstanding and is a much higher value than anything previously reported for similar composites of this type.

I claim:

1. A reinforced thermoplastic resin composite comprising a thermoplastic high molecular weight polymeric matrix material reinforced with inorganic filler material, said filler comprising from about 20 to about 80 volume percent of the total composite, said composite also containing from about 1 to about 10 weight percent, based upon the weight of inorganic filler, of derivatized propylene polymer wax of number average molecular weight from about 500 to about 10,000, said derivatized propylene polymer wax having functional reactive end groups.

2. The composite of claim 1 wherein the thermoplastic polymeric matrix material is selected from polypropylene, ethylene-propylene copolymers, and other propylene-α-olefin copolymers.

3. The composite of claim 2 wherein the inorganic filler material is selected from mica, talc, calcium carbonate, silica, glass fibres, graphite, asbestos and wollastonite.

4. The composite of claim 3 wherein the filler material is mica flakes.

5. The composite of claim 4 wherein the mica flakes are high aspect ratio mica flakes, of aspect ratio at least 30.

6. The composite of claim 5 wherein the polymeric matrix material is polypropylene.

7. The composite of claim 4 wherein the propylene polymer wax is hydrocarbon polypropylene wax.

8. The composite of claim 4 wherein the propylene polymer wax is derivatized polypropylene wax having acidic functional reactive end groups thereon.

9. The composite of claim 4 wherein the mica is surface treated with silylating agents prior to incorporation into the composite.

10. A process for preparing thermoplastic resin composites reinforced with inorganic filler material, which comprises intimately dispersing in a molten, high molecular weight thermoplastic polymeric matrix material an inorganic filler material, in the amount of about 20 to about 80 volume percent of the total composite, in the presence of from about 1 to about 10 weight percent, based on the weight of inorganic filler, of derivatized propylene polymer wax having a number average molecular weight of from about 500 to about 10,000, said derivatized propylene polymer wax having functional reactive end groups.

11. The process of claim 10 wherein the thermoplastic resin is selected from polypropylene, ethylene-propylene copolymers and other propylene-α-olefin copolymers.

12. The process of claim 11 wherein the inorganic filler material is selected from mica, talc, calcium carbonate, silica, glass fibres, graphite, asbestos and wollastonite.

13. The process of claim 12 wherein the thermoplastic resin is polypropylene and the filler material is mica flakes.

14. The process of claim 13 wherein intimate dispersion is achieved by mixing the molten thermoplastic polypropylene and the mica flakes, in the presence of said propylene polymer wax, under conditions of high shear agitation.

15. The process of claim 13 including the step of pretreating the mica with silylating agent prior to dispersing it in the molten polypropylene.

16. The process of claim 13 wherein the propylene polymer wax is hydrocarbon isotactic polypropylene wax.

17. The process of claim 13 wherein the propylene polymer wax is derivatized polypropylene wax having acidic functional reactive end groups thereon.

18. The process of claim 17 including preliminary steps of emulsifying the derivatized polypropylene wax to form an aqueous emulsion thereof, and treating the mica flakes with the aqueous wax emulsion, prior to said dispersion in molten polypropylene matrix material.

19. A reinforced thermoplastic resin composite consisting essentially of high molecular weight, crystalline, isotactic polypropylene, a mica reinforcing material, and a functionalized propylene polymer wax of number average molecular weight from about 500 to about 10,000, said functionalized propylene polymer wax having an isotactic structure and having terminal carboxyl functions resulting from reaction of terminally unsaturated isotactic polypropylene wax with maleic or succinic anhydride, the mica content being from about 20 to about 80 volume percent of the total composite, and the functionalized propylene polymer wax content being from about 1 to about 10 percent by weight based upon the weight of mica.

20. The composite of claim 19, wherein the mica is mica flakes surface treated with silylating agents prior to incorporation into the composite.

* * * * *